United States Patent [19]
Menke

[11] 3,825,729
[45] July 23, 1974

[54] CASH BOX WITH COIN COUNTER
[75] Inventor: Wilhelm Menke, Bingen, Germany
[73] Assignee: NSM-Apparatebau GmbH, Bingen/Rhein, Germany
[22] Filed: Aug. 23, 1972
[21] Appl. No.: 283,222

[30] Foreign Application Priority Data
Aug. 26, 1971 Germany............................ 2142776

[52] U.S. Cl............. 235/92 CN, 235/92 R, 194/1 F, 133/8 R
[51] Int. Cl.............................................. G06m 3/08
[58] Field of Search......... 235/92 CN; 194/1 F, 1 K, 194/DIG. 1, 9 R; 133/8 R

[56] References Cited
UNITED STATES PATENTS
1,799,784  4/1931  Donnellan..................... 235/92 CN
1,932,014  10/1933  Frankford..................... 235/92 CN
2,345,286  3/1944  Peterson............................. 194/1 F
2,523,516  9/1950  Potter............................. 235/92 CN
3,323,527  6/1967  Kepi Wu........................ 235/92 CN Primary Examiner—Paul J. Henon
Assistant Examiner—Joseph M. Thesz, Jr.
Attorney, Agent, or Firm—Wolfgang G. Fasse

[57] ABSTRACT

In a coin operated machine such as a vending machine, jukebox or gaming device, a cash box is provided with a register operated by coins passing through a slot in the cash box for continuously indicating the total value of coins in the cash box.

2 Claims, 3 Drawing Figures

CASH BOX WITH COIN COUNTER

BACKGROUND OF THE INVENTION

This invention relates to coin operated equipment such as gaming devices and the like, and more in particular to means for accurately determining and continuously indicating the amount of money in the cash boxes of such devices.

For a number of reasons it is very important to be able to rapidly determine the amount of money in the cash box of various types of devices, such as gaming devices, jukeboxes, etc. so that an accurate count of the value of coins therein is continuously available. In the past, many such devices, such as vending machines, have included means for determining the amount of money in the cash box installed therein as a function of the amount of merchandise sold, on the assumption that the number of units of merchandise vended gave an accurate count with respect to the money in the cash box. Mistakes can occur with this technique, however, since it is possible that the vending machine may be partly or totally inoperative, or that the coins may be lost in the device before they reach the cash box.

Coin operated jukeboxes in the past have been provided with "popularity meters," which record the number of times each record has been played. Such meters, however, usually have upper limits on the number of counts they can record, so that an accounting based upon this arrangement may fail to consider the plays of a record that exceed the capacity of the meter, and it has not been found to be possible to accurately record the exact amount of cash in the cash box by use of such a meter.

In a slot machine and similar gaming devices, an account of the money received by the device can only be obtained by actually counting the money, although a count of the money received by the device is not necessarily an indication of the money in the cash box, since this does not take into account the money that is paid out by the device in the form of winnings determined by chance.

In all of the above types of devices, it has been the practice to base a determination of the money in the cash box on factors which may be variable or subject to error, and to thus employ the cash box mainly as a repository for coins, so that an accurate determination of the cash in the cash box necessitates a time consuming count of the many coins therein, the task being especially time consuming when the device is of the type which accepts coins of a number of different denominations.

OBJECT OF THE INVENTION

It is therefore an object of this invention to provide means for overcoming the above problems with respect to the determining of the actual amount of money in the cash box of a coin operated device, thereby eliminating the cumbersome task of counting such coins by hand, while simultaneously providing a device of the type mentioned above in as simple and economical manner as possible.

SUMMARY OF THE INVENTION

In accordance with the invention, the above object is attained by providing a device of the above described kind with a cash box which is equipped with a meter, such as a sum indicator, that sorts the coins of different denominations, registers the deposits of the coins that are actually received in the cash box, and that adds up the value of the coins so deposited, so that the total value of coins in the box is continuously indicated.

In order to provide a receipt of the exact contents of the cash box and to simplify booking, the device in accordance with the invention may also be provided with a printing counter for printing the total sum in the cash box.

In order to further assure a correct reading of the contents of the cash box, the sum indicator may be a register counter.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
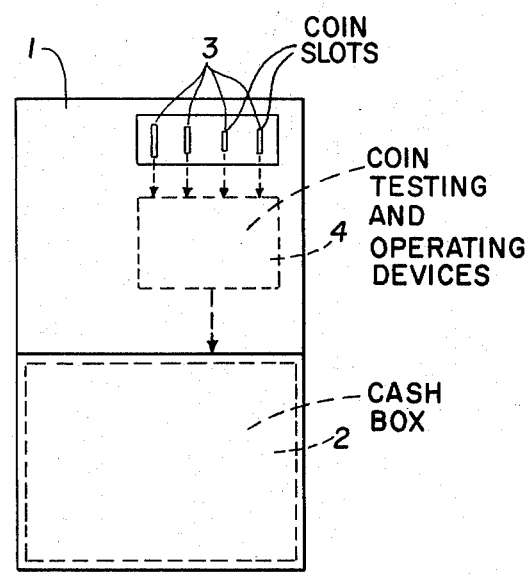
FIG. 1 is a simplified illustration of a coin operated machine incorporating a cash box, in accordance with the invention.

Referring now to the drawings, and more particularly to FIG. 1, a coin operated device 1, such as a vending machine, gaming machine, jukebox or the like, is provided with a cash box 2 in the conventional manner to receive coins deposited in the device by way of coin slots 3 after the coins have passed through conventional testing and/or operating devices 4. As discussed above, the cash boxes of previous devices have served merely as depositories of coins, the other functions of the devices being relied upon to provide an indication of how much money may be in the cash box.

Figure 2:
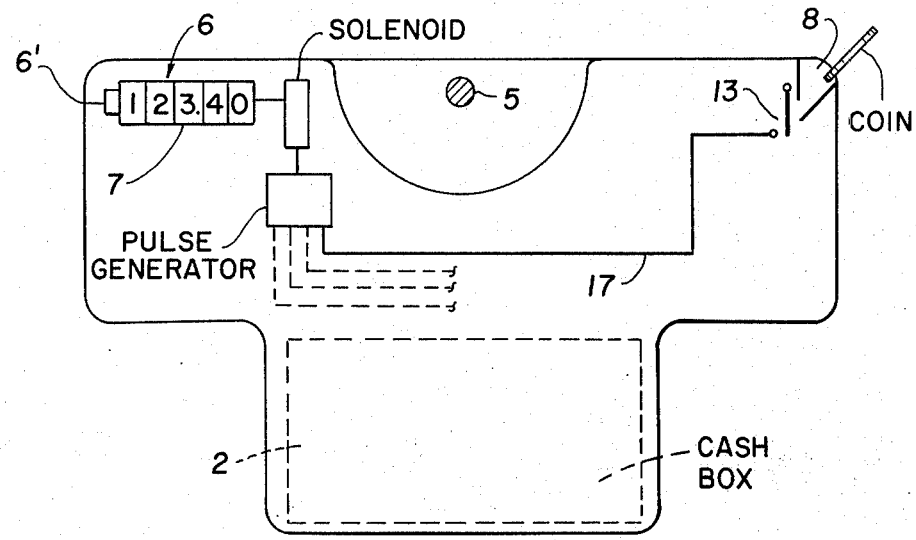
FIG. 2 is a front view of a coin box in accordance with the invention.
Figure 3:
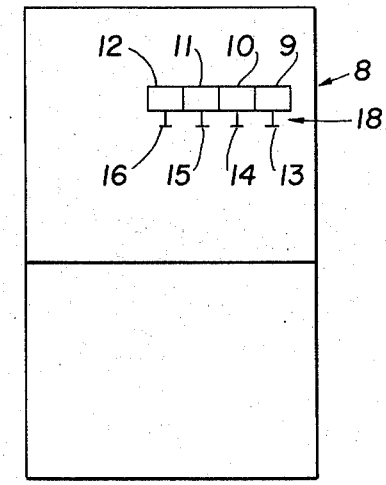
FIG. 3 is a side view of the cash box illustrated in FIG. 2.

A cash box 2 as used in accordance with the invention is illustrated in FIGS. 2 and 3. The cash box 2 is provided with a suitable handle 5. A register counter 6 is mounted on one side of the handle 5. The counter 6 has a window 7 for indicating the total sum of money in the cash box 2. A money slot, for example, a coin slot 8 is positioned on the other side of the handle 5. The slot 8 is subdivided into several openings such as openings 9, 10, 11, and 12 of which, for example, the opening 9 accepts only nickels, the opening 10 accepts only dimes, the opening 11 accepts only quarters, and the opening 12 accepts only half dollars. A sensing means such as a separate switch is operatively coupled to each coin slot opening. Thus, the sensing switches 13, 14, 15 and 16 are coupled to the slot openings 9, 10, 11 and 12 respectively, so that a contact in the switch closes each time a coin falls through the respective slot opening. For example, the switches may have switch arms positioned to be moved as a coin falls through the respective opening. These switches are wired conventionally as indicated by the conductor 17 in FIG. 2. The dashed lines indicate that there are used a number of conductors corresponding to the number of sensing means or sensing contacts employed for connecting the sensing means 13, 14, 15, 16 to a pulse generator which in turn energizes solenoid means for stepping the register counter 6 which has a reset knob 6'.

The register counter 6 displays a row of numbers visible through said window 7, the numbers being indicia on counting wheels or registers so that legible numbers are available, for example, for indicating dollars and cents up to $999.99. If desired, the last digit may only be provided with a zero and a five, if nickels are the lowest coins to be counted.

In operation, coins of the different denominations passing through the coin operated device 1 fall through their respective slots 9, 10, 11, 12 and in turn operate their respective switches 18, the response of the switches causing the operation of the register counter as described above, whereby coins of all denominations are sorted and totalled to show the final sum through the window 7. Accordingly, one can, without counting the contents of the cash box by hand, merely empty the cash box into a suitable receptacle, and return the cash box to the machine. It is only necessary to read the numbers on the register counter, and then turn a reset knob therein back to zero.

As an example of a suitable register counter apparatus, the switches may be connected to a number of pulse generators known as such to generate pulse sequences of pulses corresponding to the value of a received coin, and these pulse sequences may be applied after amplification, if necessary, to respective solenoids to operate a conventional mechanical counter. However, other counting systems may be alternatively employed, for example it may be possible to accept bills and count their values whereby the sensing could be similar to that in money change machines.

Although the invention has been described with reference to specific example embodiments, it is to be understood, that it is intended to cover all modifications and equivalents within the scope of the appended claims.

What is claimed is:

1. A coin operated machine comprising first coin slots for receiving coins of different denominations deposited in said machine, coin testing means and machine operating means for receiving coins from said first coin slot and a movable cash box positioned in said machine, said movable cash box having second coin slots for receiving coins of different denominations and positioned to receive coins from said coin testing means and machine operating means, whereby coins received by said coin slots are directed into said second coin slots, said cash box comprising a sum counter positioned within said cash box, a window in said cash box positioned to enable viewing of said counter from externally of said cash box, a separate switch at each of said second coin slots positioned to be momentarily closed upon the passage of a coin through the respective second coin slot, a pulse generator, separate conductors for connecting said switches to said pulse generator for generating sequences of pulses therein corresponding to the value of a coin received by the respective second coin slot, means applying said pulses to said sum counter, and means on said counter for manually resetting said counter.

2. The coin operated machine of claim 1, wherein said sum counter is a register counter.

* * * * *